Patented Nov. 26, 1935

2,022,246

UNITED STATES PATENT OFFICE 2,022,246

SPRAY COMPOSITION

Frank Floyd Lindstaedt, Oakland, Calif., assignor to Hercules Glue Company, Ltd., San Francisco, Calif., a corporation of California No Drawing. Application October 6, 1931,
Serial No. 567,297

14 Claims. (Cl. 167—43)

My invention relates to a spray composition, and particularly to such a composition for agricultural and horticultural uses.

The chief object of my invention is to provide an effective and absolute control for scale and other insect pests.

It is among the further objects of my invention to accomplish the above object by means of a spray composition in which a suffocating medium, such as oil, is utilized for killing the insect.

A more specific object of my invention includes the provision, in a spray composition of the character described, of means for effecting a comparatively large deposit of oil and for holding that deposit on the surface of the object sprayed for a considerable period of time.

A further object of my invention includes the provision of a spray composition which is not injurious to the plant.

My invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Insecticidal spray compositions most generally used for agricultural and horticultural purposes are of the oil in water emulsion type. At present, and particularly for the control of red, black, yellow and citricola scale insects, mineral oils are more widely used than vegetable or animal oils, and there are numerous concentrated oil emulsions on the market which when mixed and agitated with water form a composition that can be sprayed. The oil in water emulsion type of spray operates to kill the insects by suffocation, and, since it is the oil component of the spray composition which accomplishes this result, it is important that the oil deposit be comparatively heavy and remain on the sprayed surface for a reasonable period of time.

In preparing the commercial emulsion a quantity of highly refined hydrocarbon oil is generally mixed with an emulsifying agent and a small quantity of water to form an emulsion containing from 70 to 85% oil. The oils used lean toward the heavier grades, ranging from 60 to 110 degrees viscosity. While the heavier oils are injurious to the plants, a heavier and more lasting deposit is obtained by their use and consequently better control is secured.

With the present commercial emulsions a reasonable control of the insects may be effected by the use of a sufficiently heavy oil, but at the expense of subjecting the plant to possible injury which is as bad as that inflicted by the insects themselves. The high viscosity and slow rate at which they volatilize make it very difficult for the plant tissues to eliminate the heavier oils, hence the injury from this source. On the other hand, the lighter oils are eliminated from the plant vascular systems in a relatively short time.

For preparing the commercial sprays for application to objects, an amount of the concentrated oil emulsion is added to a quantity of water in a spray tank, and the resulting final spray composition is kept in constant agitation during the spraying process. To obtain reasonable control, say 95% or better, it is necessary to use from 1⅔ to 3 gallons of the present commercial emulsions to 100 gallons of spray water, and even then with the resulting spray compositions it is difficult if not impossible to obtain a deposit of oil which will effect a 100% kill of the insects.

Determinations made of the amounts of oil deposited on waxed glass surfaces shows that there is quite a variation in the amounts deposited by different commercial emulsions. Tests I have conducted show variations ranging from 50 to 175 milligrams of oil per hundred square inches. Other tests show that it is necessary to have a minimum oil deposit of 175 milligrams of oil per hundred square inches in order to obtain practically 100% kill. As the amounts of oil deposited below this point decrease the percentage of live scale rapidly increases.

Commercial spray compositions of the character described therefore fall down in two respects. First, they are apt to inflict plant injury due to the use of the heavier oils; and second, even with the use of the heavier oils, they are not capable of producing a sufficiently heavy and lasting oil deposit to insure perfect control. Jones, in Patent Number 1,646,149, has pointed out some of these difficulties.

The spray composition of my invention is designed to overcome the aforementioned defects of the present commercial types of spray compositions. With my spray composition a sufficiently heavy and lasting deposit of a comparatively low viscosity oil is made to give 100% kill of scale and other insects and without danger to the plant.

In terms of broad inclusion, the spray composition embodying my invention comprises oil and an agent added thereto which increases the weight deposit of oil per unit area sprayed and/or the persistence of the oil film. I believe this agent, which I term a carrier agent, is wetted by the oil or colloidally disperses in the oil to form a mat or sponge therein. The oil is preferably of sufficiently low viscosity to be readily eliminated from the plant vascular system. The function of the carrier agent is to provide a mat or spongy layer for retaining or holding the oil on the surface of the object sprayed. In other words, the carrier agent provides means for restraining the free escape of the oil from the surface of the object, so that a larger deposit of the oil may be made and the deposit retained for a longer period of time on the surface.

In the preferred form of my invention the oil is emulsified in the usual manner, as in an oil in water emulsion; the carrier agent being colloidally dispersed in the oil phase of the emulsion. Any well known emulsifier may be mixed with the oil and water to hold the emulsion stable. For commercial use the above emulsion is preferably prepared in concentrated form; a small amount of which is added with water in the spray tank in making up the final spray mixture. A spreader is also preferably added to the spray mixture. For this purpose any well known spreader may be used. If desirable, an emulsion reversing agent may also be added to the spray mixture. This operates to further increase the oil deposit.

In greater detail, the spray composition embodying my invention is prepared by mixing with oil a carrier agent which colloidally disperses in the oil. I have discovered that when rubber, as for example latex or any of the polymerized terpenes, such as Hevea rubber, balata rubber or gum chicle, is added to a hydrocarbon oil that, while it may form an apparent solution, it is not a true solution in fact, but a colloidal solution or pseudo solution. This means that the individual rubber particles have merely swollen up to much larger dimensions, and that these particles act as a carrier agent and form what might be equivalent to a net work or sponge with the oil in its interstices.

When a colloidal dispersion of rubber in oil is sprayed upon an object, the rubber molecules or molecular aggregates operating as the carrier agent act very much as a sponge or mat for holding the oil on the surface of the object, and for a very much longer time than if the rubber were absent. Any other agent, such as lead oleate or magnesium stearate or other of the alkaline earth heavy metal soaps, which are wetted by or colloidally disperse in the oil will function similarly to the rubber but to a lesser degree. Practically metal soaps alone can not be used since, to secure a deposit and persistence comparable to that secured with rubber, such large percentages must be used that the cumulative metal deposit will damage the tree if actual killing does not occur. It is only when the metal soaps are deposited on colloidal clays, as appears hereinafter, that they can be used successfully on vegetation, since then they are used in lower concentrations.

Using rubber, as present in latex, as the carrier agent, the following formula provides an effective concentrated emulsion:

| | cc. |
|---|---|
| Latex | 10 |
| Ammonia | 5 |
| Water | 40 |
| Oil (45 viscosity) | 160 |

In this case the latex also serves as an emulsifier. The ammonia present serves to maintain the alkalinity of the emulsion. When this emulsion was used at 2% strength in the spray tank I secured a very heavy deposit of the oil. This gave a 100% kill of all red scale and crawlers on lemons and twigs in the laboratory. The spreader used in this instance was of the following composition:

| | |
|---|---|
| Casein | 12 lbs. |
| Borax | 1½ lbs. |
| Sodium bi-carbonate | ½ lb. |
| Water__sufficient quantity to make up ten gallons | |

This mixture was added in the ratio of 1 pint to 100 gallons of water in the spray tank.

Another emulsion made up at the same time was as follows:

| | cc. |
|---|---|
| Spreader (as specified above) | 20 |
| Water | 20 |
| Oil (45 viscosity) | 160 |

When used at 2% strength in the spray tank this composition gave a very light deposit, and only 60% of the scale were killed.

Another formula that has shown 100% kill for scale is as follows:

| | cc. |
|---|---|
| Latex | 12 |
| Sulphonated castor oil | 3 |
| Ammonia | 3 |
| Water | 32 |
| Oil (45 viscosity) | 150 |

The sulphonated castor oil in this case was added as an additional emulsifier. When this emulsion was used at 2% strength in the spray tank, together with a suitable spreader, it required about three days for the oil to be absorbed from the sprayed surface. The spreader used in this case was of the following composition:

| | lbs. |
|---|---|
| Casein | 16 |
| Rosin | 6 |
| Soda ash | 2 |
| Hydrated lime | 76 |

This spreader was used in the ratio of ½ lb. to 100 gallons of water in the spray tank. An oil deposit determination with the above spray composition showed a deposit of 422 milligrams of oil to 100 sq. in., which is from 25 to 300% more than can be obtained from ordinary commercial emulsions of the same strength.

The presence of the hydrated lime in the above spray composition operates to partially reverse the oil in water emulsion, that is, to produce the "water in oil" phase, which feature further increases the oil deposit. This increase in the oil deposit by a reversed or partially reversed emulsion is due to the fact that the oil in the "water in oil" phase of the emulsion is carried on the outside of the water globules, instead of the oil being carried in the inside of the water globules as is the case with an oil in water emulsion.

In the "water in oil" phase of the emulsion the oil is first to strike the object which materially increases the probability that the oil will adhere. Furthermore, when the surface of the object is first wetted with oil, instead of with water, the chances of more sprayed oil adhering are much greater. Should the surface of the object be first wetted with water, as is the case in the "oil in water" phase where the water is first to strike the object, the probabilities of the oil adhering to the surface is materially lessened. Other substances, such as any of the alkaline earth or heavy metal salts, may be used to reverse or partially reverse the emulsion. In the claims I have used the term "water and oil" emulsion to cover either an "oil in water" or a "water in oil" emulsion, or a partially inverted type of either phase.

I have also found that clays may be used in the emulsions, and when properly treated with a carrying agent will be partially or completely wetted by the oil. Clays are frequently used as an adjunct to making commercial oil spray emulsions, for modifying the physical appearance of the emulsion. For this purpose one-tenth to one-half per cent of clay is used. In the commercial manufacture of asphalt emulsions clay is used as the principal emulsifying ingredient. For this purpose four to six per cent clay is used.

By the usual methods of manufacturing these oil spray emulsions it has been impossible to introduce large amounts, 10% or more, of clay, because when the clay is added to the oil and followed by the addition of water the clay becomes wetted by the water, swells up and separates from the oil. I am able to add large quantities of clay to the oil and have it partially or completely wetted by the oil. My object in doing this is to cause the clay to absorb and/or adsorb the oil, so that when sprayed on a surface of an object the clay will operate to cause a greater deposit of the oil on the sprayed surface, and also to cause the oil to remain for a longer period of time on the surface.

In this connection the following formula was used:

| | |
|---|---|
| White clay | 40 grams |
| Magnesium sulphate in methyl alcohol (saturated solution) | 20 cc. |
| Oil (45 viscosity) | 80 cc. |
| Corn oil soap | 6 grams |
| Water | 20 cc. |

The salt solution is first mixed with the clay and then the alcohol evaporated. The oil is then added to the dried clay and the mixture vigorously agitated while the soap and water are added. The product is a soft creamy emulsion. When used at 2% strength in the spray tank this emulsion gave a heavy and lasting deposit of oil.

The magnesium sulphate reacts with the corn oil soap to form an alkaline earth soap. The alkaline earth soap is wetted by and somewhat soluble in or colloidally dispersable in the oil, therefore the oil attaches itself to the soap. The alkaline earth soap, being absorbed and/or adsorbed into the clay, is intimately attached to the clay. Due to these conditions the clay is held partially or almost wholly in the oil phase of the emulsion, depending upon the amounts of the salt used in conjunction with the soap and the ratio of these components to the clay.

Other soluble alkaline earth salts, such as calcium chloride may be used in place of the magnesium sulphate. Any alkali soap, such as ammonium oleate or potassium cotton seed soap, may be used instead of the corn oil soap. Also the alkaline earth salt may be replaced by any of the soluble heavy metal salts, such as copper chloride or iron chloride. In the latter case a heavy metal soap is formed instead of an alkaline earth soap.

Any other substance which is also insoluble in water and which is wetted by or partially soluble in or colloidally dispersable in oil will perform the same function as the alkaline earth or heavy metal soap when it is precipitated on or in or absorbed and/or adsorbed in or on the clay. For example, the following formula gives good results:

| | |
|---|---|
| Clay | 20 grams |
| Potassium amyl xanthate | 1 gram |
| Methyl alcohol | 8 cc. |
| Copper chloride | 0.4 gram |
| Oil (45 viscosity) | 80 cc. |
| Water | 40 cc. |

The potassium amyl xanthate is dissolved in 5 cc. of the alcohol and added to the clay, then the copper chloride is dissolved in 3 cc. of the alcohol and this added to the clay mixture. The alcohol is then evaporated from the mixture and the oil added, followed by the addition of the water. A vigorous agitation of these materials introduces a soft free flowing emulsion. In this case amyl dixanthogen is formed and precipitated on the clay I believe. When this emulsion was used at 2% strength in the spray tank a heavy and lasting deposit was secured. In place of the copper amyl xanthate any other heavy metal xanthate, such as lead amyl xanthate, may be used to form a precipitate on the clay.

In reiteration it is pointed out that the improved results obtained by my spray composition are due to the presence in the emulsion of a carrier agent which is wetted by the oil or colloidally disperses in the oil. When the emulsion is sprayed on an object the oil wetted or colloidally dispersed carrier agent functions to form what might be termed a spongy layer or mat on the surface of the object to retain or hold the oil. By acting to restrain the free escape of the oil from the surface of the object sprayed, a heavy deposit of a light oil may be made, and the deposit retained on the surface of the object for a considerable period of time.

Considered from another angle, the problem solved is one of being able to deposit large amounts of oil on sprayed surfaces, with a relatively small amount of light oil in the spray tank, say in the order of one or two per cent. The improved results of my invention may be summed up by saying that an infested plant may be sprayed with my spray composition with the assurance that all of the insects will be killed, and this done without the likelihood of inflicting injury to the plant as would be the case with the heavier oils.

It is to be noted that the oil carrier employed is utilized only in very small concentrations. In the first example the proportion of carrier to oil is one to sixteen while the percent of carrier present in the spray composition is only 0.093%. Depending on the carrier, the percentage is varied and, as in the case of the clay carrier, may be larger. It is readily apparent, however, that when the carrier such as a metal soap, such as lead, iron or copper soaps, are utilized, they are not required to be present in a concentration whereat they are effective insecticidally, the oil being depended upon for this. In general, the carrier is present in the final composition in a concentration less than 1%, acting as an oil carrier and substantially nothing else. This is quite different from such a composition as that disclosed in the patent to Ellis, 993,827 wherein a metal base is used as insecticidal body in the form of metal-organic compounds of copper, lead, zinc, antimony or arsenic, for the metal base, as an oil soluble compound of copper or other metal, is utilized as having a substantial scale removing and insecticidal action.

I claim:

1. That step in the method of control of scale insects by depositing a low viscosity oil, readily eliminated by the plant vascular system, in an amount of about 1.75 milligrams per square inch of plant surface which consists in applying to the plant surface an emulsion including said oil and a carrier agent for said oil, substantially ineffective as an insecticide in said emulsion.

2. In an improved oil spraying emulsion, rubber dispersed colloidally in a low viscosity oil to increase the deposit of oil per unit area when sprayed.

3. In an improved oil spraying emulsion, a polymerized terpene dispersed colloidally in a low viscosity oil to increase the deposit of oil per unit area when sprayed.

4. In an improved oil spraying emulsion, latex dispersed colloidally in a low viscosity oil to increase the deposit of oil per unit area when sprayed.

5. In an improved oil spraying emulsion, a colloidal clay treated with an oil carrier agent and dispersed colloidally in a low viscosity oil to increase the deposit of oil per unit area when sprayed to about 1.75 milligrams per square inch of plant surface.

6. In an improved oil spraying emulsion, a colloidal clay having a water insoluble soap precipitated thereon, said clay being dispersed colloidally in a low viscosity oil to increase the deposit of oil per unit area when sprayed.

7. In an improved oil spraying emulsion, a colloidal clay having an alkali metal xanthate precipitated thereon, said clay being dispersed colloidally in a low viscosity oil to increase the deposit of oil per unit area when sprayed.

8. A spray comprising a light oil emulsified in water in the proportion of about two gallons per 100 gallons of water and including less than one per cent of an oil carrier increasing the oil deposit per unit area sprayed above that deposit secured without said carrier.

9. An emulsion for addition to water to form a spray in the proportion of about two gallons of emulsion to 100 gallons of water, the emulsion including—latex, about 352 c. c., ammonia, about 176 c. c., water, about 1410 c. c., and a low viscosity oil, sufficient to make 7570 c. c.

10. An emulsion for addition to water to form a spray in the proportion of about two gallons of emulsion to 100 gallons of water, the emulsion including—latex, about 450 c. c., sulphonated castor oil, about 12 c. c., ammonia, about 12 c. c., water, about 120 c. c., and a low viscosity oil, sufficient to make 7570 c. c.

11. The following materials in the proportions named; magnesium sulphate deposited on about 40 grams of clay, about 6 grams of corn oil soap, about 80 c. c. of a low viscosity oil, and about 20 c. c. of water.

12. A mixture of a dixanthogen deposited on a clay, and a low viscosity oil.

13. A spraying composition including a low viscosity oil as an effective spray agent and a carrier agent for said oil increasing the deposit of said oil per unit area sprayed to about 1.75 milligrams of oil per square inch of area sprayed, said carrier agent being substantially ineffective in said oil as an insecticide.

14. A spraying emulsion for use as in scale treatment comprising an emulsion including a low viscosity oil of a type readily eliminated by the plant vascular system and less than 1% of a carrier agent for said oil increasing the deposit of oil per unit area of plant surface sprayed.

FRANK FLOYD LINDSTAEDT.